UNITED STATES PATENT OFFICE.

GUSTAVUS CUPPERS, OF NEW YORK, N. Y.

IMPROVEMENT IN MANUFACTURE OF HARD-RUBBER GOODS.

Specification forming part of Letters Patent No. 20,938, dated July 20, 1858; Reissue No. 588, dated August 24, 1858.

*To all whom it may concern:*

Be it known that I, GUSTAVUS CUPPERS, of College Point, in Long Island, in the State of New York, have invented a new and Improved Method of Hardening Caoutchouc or India-Rubber and Gutta-Percha; and I do hereby declare that the following is a full, clear, and exact description of my improvements and of the manner of making and compounding and using the same.

I deem it proper to state that in using the words "india-rubber" or "gutta-perch" in this specification I mean to include all the vulcanizable gums, either alone or in combination with other substances, and in using the term "compound" I mean to designate the combination of sulphur with india-rubber or gutta-percha.

Hardened or vulcanized india-rubber and gutta-percha have of late been used for the purpose of manufacturing articles of commerce; but the more general manufacture and introduction of hardened india-rubber and gutta-percha goods have been limited and restricted by the difficulty of making these articles into every desired shape and form. The importance of remedying this evil, which has been felt in almost all the india-rubber manufactories throughout the United States and other countries, induced me to devote long continued exertions to overcome this difficulty, and, having at last become successful, I am enabled to state the nature of my invention to consist in improvements in the hardening or vulcanizing process of india-rubber and gutta-percha by which wares, goods, articles, or merchandise may be manufactured into any desired shape, form, mold, or cast.

The method of manufacturing hardened india-rubber and gutta-percha goods at present in use is as follows: The prepared soft compound, consisting of india-rubber or gutta-percha, combined with sulphur and other ingredients, is put between tin-foil and pressed in brass or other forms preparatory to subjecting it to the action of heat. With articles that do not exceed in thickness three-sixteenths of an inch this method answers the purpose; but articles having convex, concave, or uneven surfaces which exceed that thickness shrink and thereby become misshapen, so as to be useless without a great amount of extra-labor, as stated below. To obviate this result tin, has been introduced instead of tin-foil; but it is found that, although this method diminishes the shrinkage, there are cracks and a rough unseemly surface. To make articles thus produced fit for use, it was necessary to bestow upon them a great deal of extra labor by filing, rasping, sawing, cutting, and smoothing the same. In consequence of the unsatisfactory character of these results, the manufacture of hardened india-rubber, and gutta-percha has hitherto been restricted to articles requiring no considerable thickness, or to hollow articles, or to goods in which a perfect surface was not essential, or to high-priced articles; but the great mass of articles for which hard india-rubber and gutta-percha are so eminently fitted—such as handles for knives, forks, canes, whips, sabers, daggers, tools, umbrellas, knobs for doors, windows, shutters, and furniture, butt-ends for muskets, rifles, and other fire-arms, balls, clubs, pipes, and so forth—have not been manufactured in large quantities, because of the defects and costliness of the process above referred to. I have discovered the causes of this to be not in the nature of the composition used, but in the failure to provide for a proper free contraction during the heating process, and in not repairing imperfections at the proper time.

To enable others skilled in the art to make and manufacture articles of hardened caoutchouc, india-rubber, and gutta-percha according to my improved method, I will describe the mode of procedure by which I have been enabled to obtain the best results.

In the first place, I prepare the india-rubber or gutta-percha for hardening in the usual manner, and place it in the mold, made of cast-tin, or cast-brass, or pressed tin, or any other material which molds are made of. I then subject the same to the action of steam or hot air or heat of any kind, during a period of from one-half an hour to three hours. The length of time will depend upon the proportion of sulphur mixed with the india-rubber. I then remove it from the heat, and I also remove the mold from the india-rubber or gutta-percha, which by this time is in a partially-hardened state. Any blisters, holes, or other imperfections on the surface are now moistened by a liquid compound of india-rubber or gutta-percha, and are filled up and smoothed with the original compound before mentioned, and pressed again in the mold, care being taken to have the joints of the mold water-tight during the heating process, by means of small strips of india-rubber inserted between the joints or otherwise. I then press the parts firmly together by screws, or otherwise, and replace the same again in the heat, leaving it there during from about one-half an hour to three hours, when it will still be partially hardened. I then remove it again from the heat, and remove the mold from the india-rubber or gutta-percha, and if the shape be still imperfect, I perfect the same in the manner already described; but if the form be perfect, I put the same (without the mold) loosely into a box. I seal the said box hermetically, and replace the box containing the shaped articles in the heat, leaving it there until completely hardened—say about six or eight hours—after which the box is removed and opened and the process is completed. The form of the article will then be found to be perfect, although somewhat smaller than the mass originally contained in the mold. Articles of no great thickness—as combs—are partially hardened and the imperfections repaired in the manner described above. They are then replaced in the mold and the vulcanizing process completed while in the mold. In articles of considerable thickness the great contraction takes place during the last part of the heating process, and the article not being in contact with the mold at that time the contraction proceeds in a uniform manner.

It is proper to state that I use the methods above described only for the purpose of obtaining plain surfaces or forms with comparatively large ornaments. When, however, the article is to be finely and elaborately ornamental, I vary the above-described method by introducing two molds—one for the main body of the india-rubber and the other for the impressions of the ornaments. I use the mold for the main body of the rubber for the purpose of repairing imperfections, as above described, and I obtain therein about one-half or three-quarters of the ultimate degree of hardness. (This degree of hardness must be such as to enable the india-rubber or gutta-percha to still receive impressions on its surface by moderate pressure.) I then remove it from the heat, free it from the mold, and deposit it in another mold containing also the finely-marked ornaments. The parts of this mold are to be firmly pressed together by the application of screws, or otherwise, so as to convey the impression to the india-rubber or gutta-percha. In joining the two or more parts together, proper care is to be taken to make the joints water-tight by means of small strips of india-rubber, soft compound, or otherwise. The india-rubber or gutta-percha with this mold is then again subjected to the action of heat until the hardening process is completed, when the impressions will be found clear and distinct.

I wish to have it distinctly understood that I do not claim the vulcanizing process generally, but—

What I do claim as new, and desire to secure by Letters Patent, is—

The improvements in the hardening and vulcanizing of india-rubber or gutta-percha by which the manufacture of perfectly-shaped articles may be facilitated, substantially as described.

GUSTAVUS CUPPERS.

Witnesses:
CHARLES WEHLE,
T. WEHLE.